US008968605B2

(12) United States Patent
Yue et al.

(10) Patent No.: US 8,968,605 B2
(45) Date of Patent: Mar. 3, 2015

(54) CONDUCTIVE POLYMER COMPOSITION FOR PTC ELEMENT WITH DECREASED NTC CHARACTERISTICS, USING CARBON NANOTUBE

(75) Inventors: Seong-Hoon Yue, Seongnam-si (KR); Yong-Bae Jung, Cheongju-si (KR); Min-Hee Lee, Gunpo-si (KR); Won-Kook Kim, Daejeon (KR); Dong-Joo Kwon, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 104 days.

(21) Appl. No.: 13/814,013

(22) PCT Filed: Sep. 19, 2011

(86) PCT No.: PCT/KR2011/006919
§ 371 (c)(1),
(2), (4) Date: Feb. 4, 2013

(87) PCT Pub. No.: WO2012/036538
PCT Pub. Date: Mar. 22, 2012

(65) Prior Publication Data
US 2013/0140499 A1    Jun. 6, 2013

(30) Foreign Application Priority Data

Sep. 17, 2010   (KR) .................. 10-2010-0092126

(51) Int. Cl.
*H01B 1/24*         (2006.01)
*H01C 7/02*         (2006.01)
(Continued)

(52) U.S. Cl.
CPC ............ *H01C 7/022* (2013.01); *C08L 23/0853* (2013.01); *C08L 23/0869* (2013.01);
(Continued)

(58) Field of Classification Search
CPC ............ H01B 1/00; H01B 1/24; H05B 3/146; H05B 2203/013; H01C 7/027
USPC ........................................ 252/500, 502, 511
See application file for complete search history.

(56) References Cited

U.S. PATENT DOCUMENTS

| 8,003,016 | B2 * | 8/2011 | Mercx et al. ................. 252/511 |
| 8,728,354 | B2 * | 5/2014 | Bandyopadhyay et al. .. 252/512 |
| 2006/0043343 | A1 * | 3/2006 | Chacko ........................ 252/500 |
| 2013/0002395 | A1 * | 1/2013 | Luizi et al. ..................... 338/25 |

FOREIGN PATENT DOCUMENTS

| CN | 101098921 A | 1/2008 |
| JP | 2001210139 A | 8/2001 |

(Continued)

OTHER PUBLICATIONS

Wang et al "An environmentally benign fabrication process for CNTs/PE nanofibers . . . ", Journal of Fiber Bioengineering and Informatics, 2(4) 2010 267-72.*
Li et al "Easy fabrication and resistivity-temperature behavior of an anisotropically conductive carbon nanotube-polymer composite", J. Phys. Chem. B 2010, 114, 689-696.*
Gao et al "Large-scale fabrication and electrical properties of an anisotropic conductive polymer composite . . . ", Composites Science and Technology 70 (2010) 1973-1979.*

(Continued)

*Primary Examiner* — Mark Kopec
(74) *Attorney, Agent, or Firm* — Lowe Hauptman & Ham, LLP

(57) ABSTRACT

The present invention relates to a conductive polymer composition for a PTC element with decreased NTC characteristics, using carbon nanotubes, a PTC binder resin, and a cellulose-based or polyester-based resin for fixing the carbon nanotubes and the PTC binder, and to a PTC element, a circuit and a sheet heating element using the same.

11 Claims, 2 Drawing Sheets

(51) Int. Cl.
    *C08L 23/08*    (2006.01)
    *C08L 1/02*    (2006.01)
    *C08L 1/12*    (2006.01)
    *C08L 1/18*    (2006.01)
    *H01C 7/00*    (2006.01)
    *H01C 17/28*    (2006.01)
    *H05B 3/14*    (2006.01)
    *B82Y 30/00*    (2011.01)
    *C08K 7/24*    (2006.01)

(52) U.S. Cl.
    CPC .. *H01B 1/24* (2013.01); *C08L 1/02* (2013.01);
            *C08L 1/12* (2013.01); *C08L 1/18* (2013.01);
            *H01C 7/008* (2013.01); *H01C 17/28* (2013.01);
            *H05B 3/146* (2013.01); *B82Y 30/00* (2013.01);
            *Y10S 977/742* (2013.01); *Y10S 977/75*
            (2013.01); *Y10S 977/752* (2013.01); *C08K 7/24*
            (2013.01)
    USPC ............ 252/511; 977/742; 977/750; 977/752

(56) References Cited

FOREIGN PATENT DOCUMENTS

| JP | 2003086403 A | 3/2003 |
| JP | 2005187811 A | 7/2005 |
| JP | 2013513246 A | 4/2013 |

OTHER PUBLICATIONS

Sertan Yesil et al., Effect of microfiber reinforcement on the mophology, electrical, and mechanical properties of the polyethylene/poly(ethyleneterephthalate)/carbon nanotube composites, article, published online on June 25, 2010, pp. 2093-2105, vol. 50, Issue 11, Nov. 2010.

International Search Report mailed Apr. 20, 2012 for PCT/KR2011/006919, citing the above reference(s).

B Li et al.; "Easy Fabrication and Resistivity-Temperature Behavior of an Anisotropically Conductive Carbon Nanotube-Polymer Composite"; J. Phys. Chem. B. Jan. 21, 2010; 114(2); pp. 689-696.

Jie-Feng Gao et al.; "Large-scale fabrication and electrical properties of an anisotropic conductive polymer composite utilizing preferable location of carbon nanotubes in a polymer blend"; Composites Science and Technology; vol. 70; Issue 13; 2010; pp. 1973-1979.

Zhong-Ming Li et al.; "A novel approach to preparing carbon nanotube reinforced thermoplastic polymer composites"; Letters to the Editor; Carbon 43 (2005); pp. 2413-2416.

Kun Dai et al.; "Electrically conductive in situ microfibrillar composite with a selective carbon black distribution: An unusual resistivity—temperature behavior upon cooling"; Polymer; vol. 49; Issue 4; Feb. 18, 2008; pp. 1037-1048.

Japanese Notice of Allowance dated Dec. 5, 2014, citing the above reference(s). (No English translation provided).

* cited by examiner

CONDUCTIVE POLYMER COMPOSITION FOR PTC ELEMENT WITH DECREASED NTC CHARACTERISTICS, USING CARBON NANOTUBE

CROSS REFERENCE TO RELATED APPLICATION

This application claims the priority of Korean Patent Application No. 10-2010-0092126, filed on Sep. 17, 2010 in the KIPO (Korean Intellectual Property Office). Further, this application is the National Phase application of International Application No. PCT/KR2011/006919 filed Sep. 19, 2011, which designates the United States and was published in Korean.

TECHNICAL FIELD

The present invention relates to a conductive polymer composition for a PCT element having reduced NTC characteristics using carbon nanotubes and to a PCT element, a circuit, and a sheet heating element using the same.

BACKGROUND ART

Positive temperature coefficient (PCT) characteristics refer to properties that a material has conductivity at low temperature, for example, about room temperature, due to low resistance, but drastically increases in electric resistance in a comparatively narrow temperature range as the temperature increases. Thus, a PTC conductive polymer composition having such characteristics is properly used for an electric element, such as a circuit protection element, which changes depending on ambient temperature and current conditions.

A PTC element generally has a structure which includes a resistor of a conductive polymer composition, two electrodes attached to the resistor and connected to a power source, and an electrolyte metal foil on the electrodes.

Normally, a circuit protection element is connected in series with a load in an electric circuit to maintain a low-temperature low-resistance state. However, when exposed to overcurrent or excessive temperature conditions, the element increases in resistance and effectively blocks current flow to the load in the circuit. The element is restored to a low-resistance state upon returning to room-temperature low-current and low-temperature states, while it involves occurrence of NTC characteristics wherein resistance of a resin decreases due to re-agglomeration by Brownian motion and the van der Waals force of a conductive filler when temperature stays at a melting point for a long time or increases to a higher temperature.

Meanwhile, a conventional PTC composition generally includes carbon black or graphite as a conductive polymer. Carbon black and graphite are spherical particles having a minor diameter to major diameter ratio of 80% or higher and readily short-circuit by resin expansion to easily exhibit PTC characteristics, while short-circuited particles may not contact again when bending occurs by external impact (FIG. 1).

Thus, the inventors of the present invention have conducted studies on a PTC element that maintains conductivity even after external impact and discovered that when carbon nanotubes (CNTs) which are thin and long are used for a conductive polymer, the conductive polymer maintains conductivity even after external impact, such as bending, due to good restoring force of the CNTs.

Further, the inventors tried sought a method of using a crystalline polymer having substantial volumetric change as a PTC binder (that is, a first resin) in order to disperse the CNTs tending to agglomerate due to a strong bond between molecules, as compared with carbon black or graphite relatively good in dispersibility and solubility in a general solvent.

However, even though a PTC element is manufactured using CNTs, NTC characteristics occurs upon repeated application of voltage. Thus, as a result of extensive studies, the inventors found out that when a thermosetting resin or a second resin having higher Tm or softening point or greater molecular weight than a first resin is further added, the CNTs and the first resin are fixed to prevent the CNTs from flowing upon repeated change of temperature and to prevent NTC characteristics wherein resistance decreases with increasing temperature.

DISCLOSURE

Technical Problem

An aspect of the present invention is to provide a conductive polymer composition for a positive temperature coefficient (PTC) element causing reduced NTC characteristics.

Another aspect of the present invention is to provide a PTC element causing reduced NTC characteristics and a method of manufacturing the same.

A further aspect of the present invention is to provide a sheet heating element causing reduced NTC characteristics and having PTC characteristics.

Yet another aspect of the present invention is to provide a circuit causing reduced NTC characteristics and having PTC characteristics.

Technical Solution

Embodiments of the present invention provide a conductive polymer composition for a positive temperature coefficient (PTC) element, including: carbon nanotubes, a first resin, and a second resin, wherein
1) the first resin is one selected from the group consisting of polyolefin resins and silicone resins; and
2) the second resin is one selected from the group consisting of cellulose resins and polyester resins.

Embodiments of the present invention provide a PTC element, a sheet heating element, and a circuit which include the conductive polymer composition for the PTC element.

Embodiments of the present invention provide a method of manufacturing a PTC element which includes stacking an electrode and an electrolyte metal foil on a thin-film resistor including the composition.

Advantageous Effects

A circuit, a heating element (heater), and a PTC element which use a conductive polymer composition for a positive temperature coefficient (PTC) element according to embodiments of the present invention do not easily change in contact resistance even after external impact or bending and have excellent restoring force even in the case where temperature goes up and then down.

BEST MODE

Figure 1:
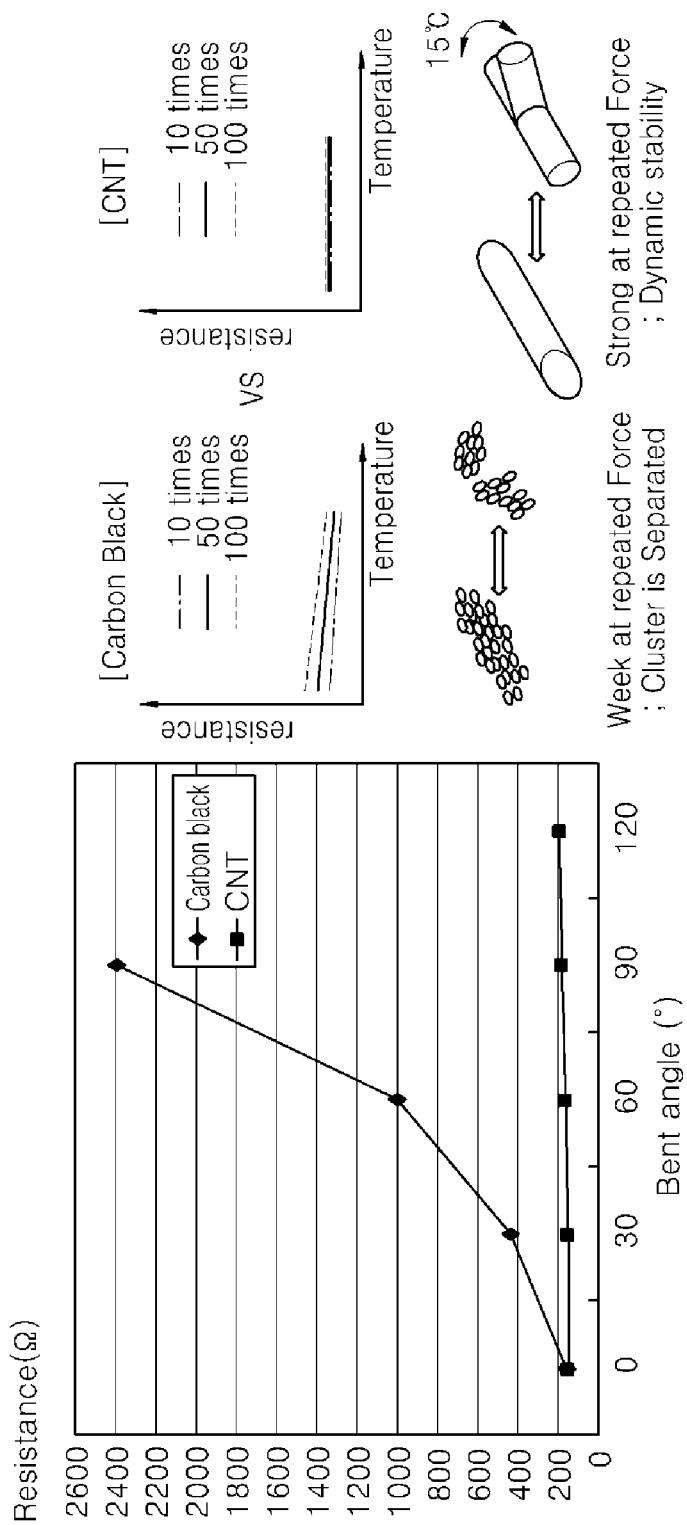
FIG. 1 illustrates resistance change of a sample prepared by printing and drying carbon black and CNTs on a 150 mm×300 mm BOPET and connecting a digital multimeter (YOKOGAWA 733) to an electrode while performing a 180- degree bending test, showing resistance change of the carbon black and the CNTs by bending and durability change by repeated impact.

The present invention provides a conductive polymer composition for a positive temperature coefficient (PTC) element including carbon nanotubes, a first resin, and a second resin, wherein 1) the first resin is one selected from the group consisting of polyolefin resins and silicone resins; and 2) the second resin is one selected from the group consisting of cellulose resins and polyester resins.

In addition, the present invention provides a PTC element, a sheet heating element, and a circuit, which include the conductive polymer composition for the PTC element.

Further, the present invention provides a method of manufacturing a PTC element, which includes stacking an electrode and an electrolyte metal foil on a thin-film resistor including the composition.

Now, embodiments of the present invention will be described in detail.

In the present invention, carbon nanotubes (CNTs) refer to general carbon nanotubes, which may be single-walled nanotubes (SWNTs) or multi-walled nanotubes (MWNTs). The CNTs may have a diameter of 10 nm to 60 nm, and an aspect ratio of 1,000 or higher to have high-efficiency exothermic properties which permit temperature increase at a rate of 10° C. or higher per minute at 12V with a small amount of the carbon nanotubes, without being limited thereto.

The mass ratio of the CNTs to the first and second resins may range from 1:4 to 1:16, at which CNTs do not deteriorate in flowability printability, resin dispersion and adhesion, and provide a proper level of sheet resistance to allow high-efficiency heating. Preferably, the mass ratio of the CNTs to the first resin ranges from 1:2 to 1:9 (that is, the first resin is present in an amount of 200 to 900 parts by weight based on 100 parts by weight of the CNTs), and the mass ratio of the CNTs to the second resin ranges from 1:2 to 1:7 (that is, the second resin is present in an amount of 200 to 700 parts by weight based on 100 parts by weight of the CNTs), without being limited thereto.

The first resin serves as a PTC binder performing a PTC function.

In the present invention, any polyolefin resin generally known in the art may be used. Further, the polyolefin resins may include polyethylene resins or polypropylene resins, modified polyethylene resins, modified polypropylene resins, ethylene copolymers, or propylene copolymers.

Polyethylene may include high-density polyethylene (HDPE), medium-density polyethylene (MDPE), low-density polyethylene (LDPE), linear low-density polyethylene (LLDPE), and mixtures thereof, or also include maleic anhydride grafted polyethylene, specifically maleic anhydride grafted high-density polyethylene (m-HDPE), maleic anhydride grafted low-density polyethylene (m-LDPE), and the like. The ethylene copolymer and the propylene copolymer may include copolymers of ethylene and polar group-containing monomers, copolymers of propylene and polar group-containing monomers, and mixtures thereof, without being limited thereto.

Examples of the ethylene copolymer or propylene copolymer may include an ethylene/acrylic acid copolymer, an ethylene/methacrylic acid copolymer, ethylene/ethyl acrylate, an ethylene-butyl acrylate copolymer, an ethylene-vinyl acetate copolymer, an ethylene/itaconic acid copolymer, an ethylene/monomethyl maleate copolymer, an ethylene/maleic acid copolymer, an ethylene/acrylic acid/methyl methacrylate copolymer, an ethylene/methacrylic acid/ethyl acrylate copolymer, an ethylene/monomethyl maleate/ethyl acrylate copolymer, an ethylene/methacrylic acid/vinyl acetate copolymer, an ethylene/acrylic acid/vinyl alcohol copolymer, an ethylene/propylene/acrylic acid copolymer, an ethylene/styrene/acrylic acid copolymer, an ethylene/methacrylic acid/acrylonitrile copolymer, an ethylene/fumaric acid/vinyl methyl ether copolymer, an ethylene/vinyl chloride/acrylic acid copolymer, an ethylene/vinylidene chloride/acrylic acid copolymer, an ethylene/chlorotrifluoroethylene/methacrylic acid copolymer, and corresponding propylene copolymers. Preferably an ethylene-EVA copolymer or an ethylene-MMA copolymer is used.

The silicone resins may include any typical silicone resins, including modified silicone resins. The silicone resins may include silicone wax. For example, the silicone resins may include silicone rubber, for example, Silastic® from Dow Corning, silicone wax, for example, E32 from Wacker, and the like.

The second resin serves to hold the CNTs and the first resin to prevent flow of the CNTs upon repeated temperature variation and to prevent exhibition of NTC characteristics wherein resistance decreases with increasing temperature. Thus, the second resin is a thermosetting resin or has a higher Tm or softening point than the first resin, wherein the softening point of the second resin may be 130° C. or higher or the Tm or softening point of the second resin may be 1.5 times or more higher than those of the first resin, without being limited thereto.

In addition, the second resin preferably has a higher molecular weight than the first resin in order to reduce fluidity of the CNTs after coating and drying. More preferably, the second resin has a molecular weight of 10,000 to 50,000, even more preferably 10,000 to 30,000 in consideration of cost efficiency.

The cellulose resins may include any general cellulose resin, for example, nitrocellulose or acetylcellulose. Further, the cellulose resins may include ethyl cellulose or butyl cellulose from Junsei or STD-10 from Dow.

The polyester resins may include any general polyester resin. For example, polyester SP-1 or K150 produced by Polyester Binder KSA may be used.

The first resin preferably has a molecular weight of 3,000 or higher and a softening point of 45 to 150° C., more preferably 120 to 150° C., without being limited thereto.

The second resin preferably has a molecular weight of 10,000 or higher and a softening point of 130° C., without being limited thereto.

The composition may further include general conductive fillers, such as nickel powder, gold powder, copper powder, metal alloy powder, carbon powder, graphite powder, and the like.

Moreover, the composition may further include polyvinyl polymers, such as polyvinyl chloride, polyvinylidene chloride, polyvinyl fluoride and polyvinylidene fluoride, and thermosetting polymers, such as polysulfone and polyamide.

In addition, the composition may further include an antioxidant, a deterioration preventing agent, or an antifoaming agent.

The composition may be printed or applied to a base, thereby producing a PTC element, a sheet heating element, or a circuit.

To serve as a heating ink or paste, the composition of the present invention preferably has a thin thickness of a dried film after coating, which enables quick drying to increase mass productivity and complete drying from a surface to an inside to decrease in resistance, more preferably a thickness of 10 μm or less, even more preferably 5 μm or less.

When the composition of the present invention is used for a PTC element, a sheet heating element, or a circuit, a 5 nm-coated element preferably has a sheet resistance of 50 Ω/sq to 1,000 Ω/sq, more preferably 50 Ω/sq to 800 Ω/sq. When the sheet resistance is too low, flowability of the composition worsens to reduce printability and viscosity thereof increases excessively, decreasing manufacturing efficiency. When the sheet resistance is 1,000 Ω/sq or higher, the composition exhibits low heating performance of 10° C./min or less at 12V. When the sheet resistance is 50 Ω/sq or less, the composition reaches 200° C. or higher within 3 minutes due to a drastic heating phenomenon, causing a user to be burned, and it is difficult to control resistance using PTC because electrons move too fast despite addition of a PTC binder. Such a sheet resistance range is illustrated to achieve optimal and maximum efficiency of the present invention. Although efficiency or safety slightly decreases when the sheet resistance is out of this range, the range is not construed as limiting the scope of the claims of the present invention.

Now, the present invention will be explained in more detail with reference to examples and experimental examples. These examples are provided for illustration only and are not to be in any way construed as limiting the invention.

Examples 1 to 6 and Comparative Examples 1 to 7

Conductive polymer compositions were prepared according to compositions listed in Table 1 and used to prepare conductive thin film samples for a PTC element. To measure resistance, an electrode was bonded to each conductive thin film sample for the PTC element, thereby preparing a PTC element, which will be described in detail as followed.

CNTs were synthesized using a metal catalyst, subjected to acid treatment to form carboxyl groups (—COOH) on a surface of the CNTs, and subjected to acyl chlorination and amino functionalization to obtain amine group-attached CNTs. The functionalized CNTs were mixed with a PTC binder, which is an ethylene-EVA copolymer (ASTOR 538, ASTOR 635), an ethylene-MMA copolymer (WK-402, WK-307), PE Wax (802C, 503NC, 106N) or Dow (STD-10), a dispersant (BYK 9076, BYK 9077), and an ethyl cellulose binder (JUNSEI EC50, Dow STD-10) or a polyester binder (KSA SP-1), followed by eliminating bubbles via a paste mixer (DAE WHA TECH DDM-300), thereby preparing a paste via a 3-roll mill (EXAKT 80S). The paste was applied to a thickness of 5 nm to BOPET using gravure printing and dried at 130° C. for 10 minutes, followed by printing a patterned Ag paste (Daejoo Electronic Materials Co., Ltd., DHC-7075 or 7045) to a thickness of 7 to 10 nm using silk screen and drying at 130° C. for 10 minutes, thereby preparing a heating element for low voltage PTC.

TABLE 1

| | Heating element CNT | LDPE | First resin Ethylene-EVA copolymer | Ethylene-MMA copolymer | Silicone wax | Second resin Cellulose resin | Polyester resin | Additive Dispersant | Solvent DBA/Terpineol |
|---|---|---|---|---|---|---|---|---|---|
| Example 1 | To 100 | | 900 | | | 700 | | 680 | 1000 |
| Example 2 | To 100 | | | 900 | | 700 | | 600 | 1000 |
| Example 3 | To 100 | | 220 | | | | 700 | 460 | 880 |
| Example 4 | To 100 | | | 900 | | | 210 | 380 | 880 |
| Example 5 | To 100 | | 200 | | | 200 | | 450 | 1000 |
| Example 6 | To 100 | | | 200 | | 200 | | 330 | 660 |
| Comparative Example 1 | To 100 | | | | 600 | | | 340 | 880 |
| Comparative Example 2 | To 100 | 600 | | | | | | 600 | 1000 |
| Comparative Example 3 | To 100 | | | | | | 600 | 400 | 800 |
| Comparative Example 4 | To 100 | | 600 | | | 180 | | 400 | 880 |
| Comparative Example 5 | To 100 | | | 700 | | 750 | | 430 | 1000 |
| Comparative Example 6 | To 100 | | 150 | | | 550 | | 350 | 800 |
| Comparative Example 7 | To 100 | | | 1000 | | 600 | | 320 | 800 |

Experimental Example 1

Each PTC element was evaluated as to sheet resistance (Ω/sq), adhesion (cross cut), PTC characteristics, sheet resistance increase ratio (=130° C./25° C.), and occurrence of NTC characteristics.

Sheet resistance was measured using Loresta-GP (MCP-T610), and adhesion was measured by attaching/detaching a 3M Seil Tape to/from 10 lattices cross-cut at an interval of 1 mm. Each PTC paste prepared above was printed and dried on a 150 mm×300 mm BOPET having a thickness of 100 μm, followed by applying and drying Ag electrodes at an interval of 4 mm on the dried PTC-CNT side, separately connecting the electrodes to a digital multimeter (YOKOGAWA 733) and attaching to a hot plate, after which resistance change was measured while increasing temperature at 10° C./min. When the resistance in the digital multimeter continued to increase or stopped in an increased state as the temperature continuously increased, it was determined that no NTC characteristics were exhibited. If resistance decrease occurred as the temperature of the hot plate increased, it was concluded that NTC characteristics were exhibited.

Results

When silicone wax as the first resin and CNTs were used without the second resin, the composition exhibited remarkable PTC characteristics but had a difficulty in reducing sheet resistance due to a dispersion problem with the CNTs (Comparative Example 1). Meanwhile, when LDPE and CNTs were used without the second resin, an adhesion problem occurred as the composition gravure-printed and dried on BOPET was detached, thereby making it difficult to analyze PTC and NTC characteristics (Comparative Example 2).

Further, when only a polyester resin as the second resin and CNTs were used, since the first resin served as a PTC binder, it was impossible to analyze PTC and NTC characteristics (Comparative Example 3). When a small amount of the first resin was used, it was difficult to analyze PTC characteristics (Comparative Example 6).

In addition, even in the case where the composition included both the first resin and the second resin, the composition did not exhibit excellent properties in terms of sheet resistance, adhesion, PTC and NTC characteristics (Comparative Examples 4 to 7) as in Examples 1 to 6, when the amount of the first resin is outside a range of 200 to 900 parts by weight based on 100 parts by weight of the CNTs or the amount of the second resin is outside a range of 200 to 700 parts by weight based on 100 parts by weight of the CNTs.

However, when an ethylene-EVA copolymer and a polyester resin were used together with the CNTs, PTC temperature changed according to the ratio thereof (Examples 3 and 4). Thus, it could be determined that it would be possible to elaborately modify PTC characteristics by changing kinds and ratios of the first resin and the second resin. Furthermore, when the ethylene-EVA copolymer and the polyester resin were mixed, the compositions had no problems in terms of sheet resistance and adhesion and did not exhibit NTC characteristics (Table 2).

Therefore, based on the experimental results, use of a cellulose resin and polyester as a second resin may minimize NTC characteristics (Examples 1 to 6) and a PTC element having a sheet resistance of about 200 Ω/sq may be manufactured by adjusting the amounts of the first and second resins. Particularly, considering that Examples 1, 2, 5 and 6 did not exhibit NTC characteristics and had excellent results in other measurements, the first resin is preferably present in an amount of 200 to 900 parts by weight based on 100 parts by weight of the CNTs and the second resin is preferably present in an amount of 200 to 700 parts by weight based on 100 parts by weight of the CNTs.

TABLE 2

| | Sheet resistance (Ω/sq) | Adhesion | PTC characteristics | Sheet resistance increase ratio | NTC occurrence |
|---|---|---|---|---|---|
| Example 1 | 195 | ○ | 57 | 308 | X |
| Example 2 | 200 | ○ | 63 | 211 | X |
| Example 3 | 160 | ○ | 67 | 305 | X |
| Example 4 | 240 | ○ | 78 | 302 | X |
| Example 5 | 210 | ○ | 59 | 207 | X |
| Example 6 | 190 | ○ | 60 | 301 | X |
| Comparative Example 1 | 6,000 | ○ | 60 | 100 | X |
| Comparative Example 2 | 140,000 | X | — | — | — |
| Comparative Example 3 | 200 | ○ | — | — | — |
| Comparative Example 4 | 5150 | X | 75 | 120 | ○ |
| Comparative Example 5 | 3800 | X | 79 | 150 | X |
| Comparative Example 6 | 7000 | X | — | — | — |
| Comparative Example 7 | 90,000 | X | — | — | — |

Experimental Example 2

A film heater formed with a 400 mm (L)*300 mm (D) pattern was prepared using the composition of Example 1 among Examples 1 and 2, which prevented occurrence of the NTC characteristics and exhibited excellent PTC characteristics in Experimental Example 1, and put into a Matiz oven providing similar operating conditions to the heater, followed by observation of resistance change using the digital multimeter while elevating temperature at 10° C./min from 25° C. to 180° C. Further, resistance change of the comparative examples in Experimental Example 1 according to temperature increase was observed in the same manner.

Testing was carried out under the following conditions, in which resistance change of the heater was measured using the multimeter.

Set temperature: 180° C.
Temperature increasing rate: 10° C./min
Ambient temperature: 25° C.

Figure 2:
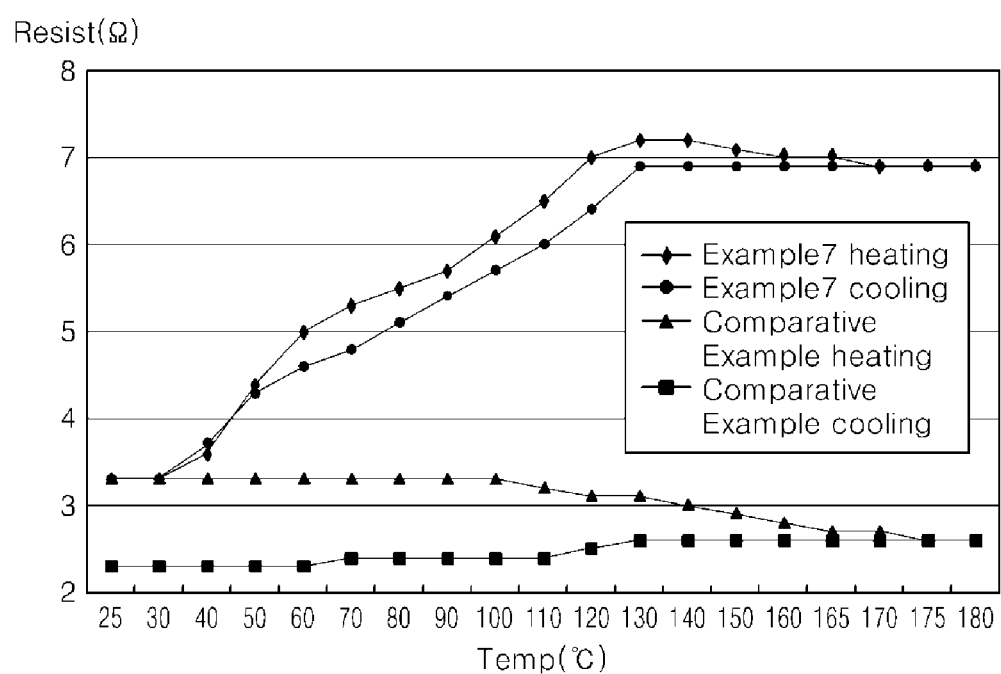
FIG. 2 illustrates PTC function evaluation of a PTC-CNT heater with anti-NTC characteristics according to the present invention.

As a result, the PTC-CNT heater of the present invention increased in resistance according to temperature from 30° C. to 130° C. and did not exhibit NTC characteristics. However, the CNT heater prepared in the comparative examples had no resistance change up to 110° C. and then exhibited resistance decrease as the temperature continued to increase (FIG. 2).

Experimental Example 3

The PTC-CNT heater of Experimental Example 2 was evaluated as to repeat durability as a resistance change ratio to initial resistance by repeatedly turning on and off the heater. Testing was carried out under the following conditions.

Used voltage: 12 V
Consumed power: 42 W
Ambient temperature: 25° C.
2-minute On/3-minute Off (1 cycle: 5 minutes)
Resistance measurement using multimeter 30 minutes after complete turn-off As a result, it could be seen that the PTC-CNT heater of the present invention exhibited resistance increase by electric shock but had excellent durability within 5% (Table 3).

TABLE 3

| Number of turn-on/off cycles | Resistance (Ω) | Change ratio (%) |
|---|---|---|
| 0 | 3.5 | 0 |
| 500 | 3.5 | 0 |
| 1,000 | 3.53 | 0.9 |
| 2,000 | 3.56 | 1.7 |
| 3,000 | 3.60 | 2.8 |
| 5,000 | 3.64 | 4.0 |
| 8,000 | 3.66 | 4.5 |
| 10,000 | 3.66 | 4.5 |
| 15,000 | 3.66 | 4.7 |
| 20,000 | 3.67 | 4.9 |

The invention claimed is:

1. A conductive polymer composition for a positive temperature coefficient (PTC) element comprising:
   carbon nanotubes;
   a first resin; and
   a second resin,
   wherein
      1) the first resin comprises one selected from the group consisting of polyolefin resins and silicone resins, and
      2) the second resin comprises nitrocellulose or acetylcellulose.

2. The conductive polymer composition according to claim 1, wherein the first resin comprises a polyethylene resin or a polypropylene resin.

3. The conductive polymer composition according to claim 1, wherein the first resin comprises a modified polyethylene resin, a modified polypropylene resin, an ethylene copolymer, a propylene copolymer, or a modified silicone resin.

4. The conductive polymer composition according to claim 1, wherein the first resin comprises low-density polyethylene (LDPE), an ethylene-ethylene vinyl acetate (ethylene-EVA) copolymer, an ethylene-methyl methacrylate (ethylene-MMA) copolymer, silicone wax.

5. The conductive polymer composition according to claim 1, wherein the carbon nanotubes comprise single-walled nanotubes (SWNTs) or multi-walled nanotubes (MWNTs).

6. The conductive polymer composition according to claim 1, wherein the first resin is present in an amount of 200 to 900 parts by weight based on 100 parts by weight of the carbon nanotubes.

7. The conductive polymer composition according to claim 1, wherein the second resin is present in an amount of 200 to 700 parts by weight based on 100 parts by weight of the carbon nanotubes.

8. A positive temperature coefficient (PTC) element comprising the composition according to claim 1.

9. A sheet heating element comprising the composition according to claim 1.

10. A circuit comprising the composition according to claim 1.

11. A method of manufacturing a positive temperature coefficient (PTC) element, comprising:
    stacking an electrode and an electrolyte metal foil on a thin-film resistor comprising the composition according to claim 1.

* * * * *